(12) United States Patent
Krebs

(10) Patent No.: US 12,548,766 B2
(45) Date of Patent: Feb. 10, 2026

(54) ELECTROCHEMICAL ENERGY STORAGE CELL AND BATTERY

(71) Applicant: VARTA Microbattery GmbH, Ellwangen Jagst (DE)

(72) Inventor: Martin Krebs, Rosenberg (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 525 days.

(21) Appl. No.: 17/979,821

(22) Filed: Nov. 3, 2022

(65) Prior Publication Data

US 2023/0155114 A1 May 18, 2023

(30) Foreign Application Priority Data

Nov. 13, 2021 (EP) ..................... 21208103

(51) Int. Cl.
*H01M 4/36* (2006.01)
*H01M 4/02* (2006.01)
*H01M 4/131* (2010.01)
*H01M 4/42* (2006.01)
*H01M 50/509* (2021.01)

(52) U.S. Cl.
CPC ........... *H01M 4/366* (2013.01); *H01M 4/131* (2013.01); *H01M 4/42* (2013.01); *H01M 50/509* (2021.01); *H01M 2004/027* (2013.01); *H01M 2004/028* (2013.01)

(58) Field of Classification Search
CPC ...... H01M 4/366; H01M 4/131; H01G 11/76; H01G 11/10; H01G 11/08
See application file for complete search history.

(56) References Cited

U.S. PATENT DOCUMENTS

| | | |
|---|---|---|
| 2003/0035982 A1 | 2/2003 | Ryu et al. |
| 2010/0081049 A1 | 4/2010 | Holl et al. |
| 2021/0035054 A1 | 2/2021 | Backhaus et al. |
| 2021/0065992 A1 | 3/2021 | Lu et al. |

FOREIGN PATENT DOCUMENTS

| | | |
|---|---|---|
| EP | 1 391 961 A1 | 2/2004 |
| EP | 2 960 967 B1 | 11/2016 |
| JP | H05-54895 A | 3/1993 |

(Continued)

*Primary Examiner* — Sarah A. Slifka
(74) *Attorney, Agent, or Firm* — DLA Piper LLP (US)

(57) ABSTRACT

An electrochemical energy storage cell includes a first electrically insulating substrate and a first electrical conductor layer extending on an area of the first electrically insulating substrate, a second electrically insulating substrate and a second electrical conductor layer extending on an area of the second electrically insulating substrate, a first electrode layer composed of positive electrode material, a second electrode layer composed of negative electrode material, a first separator layer, a stacked arrangement of the layers: the first electrically insulating substrate—the first electrical conductor layer—the first electrode layer—the first separator layer—the second electrode layer—the second electrical conductor layer—the second electrically insulating substrate, a first electrolyte enabling an ion flow between the electrode layers, an electrode region with the stacked arrangement of the electrode layers and a supercapacitor region, a second separator layer, a second electrolyte enabling an ion flow between the supercapacitor layers.

11 Claims, 4 Drawing Sheets

(56) References Cited

FOREIGN PATENT DOCUMENTS

| KR | 10-2009-0110469 A | 10/2009 |
|---|---|---|
| KR | 10-2017-0098004 A | 8/2017 |
| WO | 2006/105966 A1 | 10/2006 |
| WO | 2008/113133 A1 | 9/2008 |
| WO | 2011/151263 A1 | 12/2011 |
| WO | 2019/145224 A1 | 8/2019 |
| WO | 2019/204964 A1 | 10/2019 |

Fig. 2(A)
Fig. 2(B)
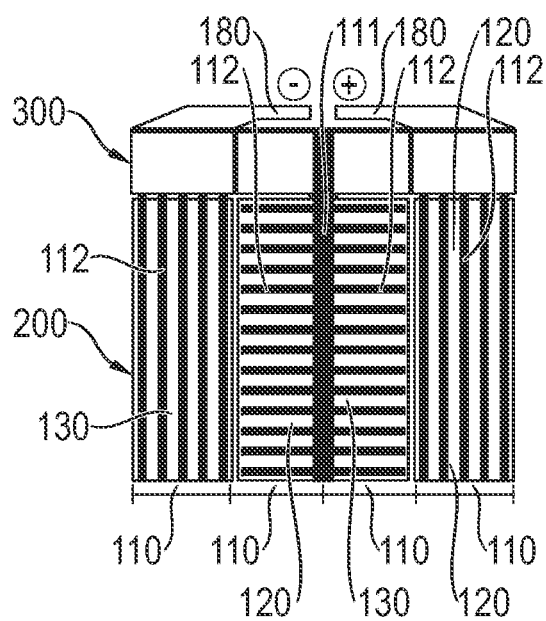
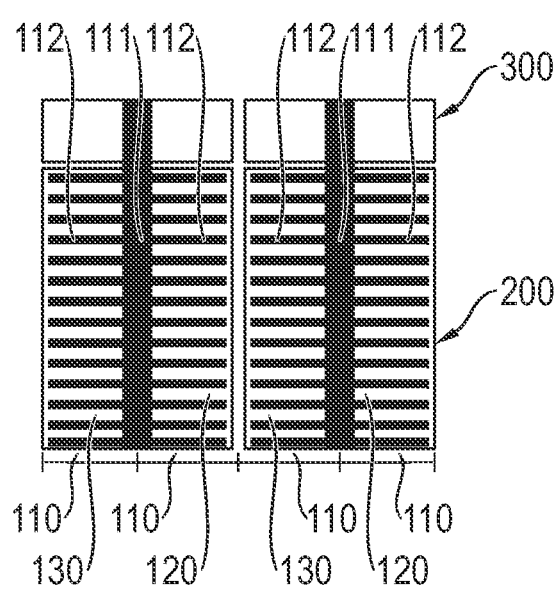

ELECTROCHEMICAL ENERGY STORAGE CELL AND BATTERY

TECHNICAL FIELD

This disclosure relates to an electrochemical energy storage cell having a layered construction and a stacked arrangement of the electrode layers, and a battery constructed from such electrochemical energy storage cells as well as use of the battery and a method of producing the energy storage cell or the battery.

BACKGROUND

Electrochemical energy storage cells and batteries are known in a wide variety of configurations. In this regard, there are printed cells or batteries, in which functional parts, in particular electrodes and current lead layers, are printed onto a suitable substrate. Various pastes can be used for that purpose, which are printed onto an electrically non-conductive substrate in the desired form by a screen printing method, for example.

The term "electrochemical energy storage cell" or "electrochemical cell" means an individual cell capable of storing electrical energy and having at least one positive electrode and at least one negative electrode. An electrochemical, energy-yielding reaction takes place in electrochemical cells, the reaction being composed of two partial reactions that are electrically coupled to one another, but spatially separated from one another. One partial reaction that takes place at a comparatively low redox potential proceeds at the negative electrode. One reaction that proceeds at a comparatively higher redox potential proceeds at the positive electrode. During discharge, electrons are released at the negative electrode as a result of an oxidation process, resulting in an electron current via an external consumer to the positive electrode, which absorbs a corresponding amount of electrons. A reduction process thus takes place at the positive electrode. At the same time, an ion current corresponding to the electrode reaction occurs within the electrochemical cell for the purpose of charge balancing. The ion current is ensured by an ion-conducting electrolyte.

If a plurality of electrochemical cells are interconnected, the term "battery" is used.

WO 2006/105966 A1 describes a galvanic element or an electrochemical cell in which at least one positive electrode and at least one negative electrode are arranged next to one another on a planar, electrically non-conductive substrate and are connected to one another via an ionically conductive electrolyte. The planar substrate can be in particular a film, for example, a plastic film. Conductor tracks serving as leads or collectors for the current flow are situated between the planar substrate and the actual electrodes or the electrochemically active electrode material. By way of example, electrically conductive films, in particular metal films, can be used for this purpose. The conductor tracks can alternatively be applied to the substrate by a printable paste.

Besides such coplanar arrangements of electrodes, thin, flexible electrochemical cells or batteries having a multi-layered construction are known, too, in which planar electrodes in the form of electrode layers are arranged one above another as a stack. WO 2011/151263 A1 describes one such battery having a stacked arrangement of the electrodes. The electrode layers of opposite polarity arranged one above another are separated from one another by an intervening separator layer and form with the latter an electrode-separator stack. As current leads, current collectors connected to terminal contacts can be applied to a battery carrier or a substrate. The electrode layers are in direct contact with the current collectors and are connected to a consumer via terminal contacts.

Such printed batteries or electrochemical cells can be rechargeable or non-rechargeable, in principle.

Zinc-manganese dioxide batteries are particularly widely used printed batteries. In those batteries, for example, a printable zinc paste comprising zinc powder, a suitable binder and a suitable solvent can serve as anode material for the negative electrode. A printable paste comprising manganese dioxide ($MnO_2$) and also carbon black and/or graphite as conductive material and a suitable binder and a suitable solvent can be used, in particular, for producing the cathode or the positive electrode. Appropriate current leads for the negative electrode include in particular silver, copper and/or graphite. The current leads of the positive electrode are preferably formed on the basis of silver, nickel and/or graphite. Silver conductive pastes are particularly widely used for both current lead layers.

On account of their thin and flexible structure, printed electrochemical cells or batteries of that type are suitable for diverse applications, in particular also for supplying energy to articles having a relatively short lifetime, for example, for disposable articles.

One particularly diversely usable example of the use of printed electrochemical energy storage cells and batteries is RFID tags. RFID tags can be used to track all types of products, for example, pharmaceuticals and agricultural pesticides. Such RFID tags are described in WO 2019/145224 A1, for example. They generally comprise an energy supply unit, at least one sensor, a control unit, a data memory in which a unique product identifier is stored, and a transmitting and/or receiving unit. With the aid of the sensor, it is possible to determine state information relating to the product, for example, relating to the opening state of its packaging. The control unit can then cause the transmitting and/or receiving unit to transmit the state information and the product identifier to a data receiver.

RFID tags can use mobile radio networks, in particular, to send state information and/or a product identifier, for example. Mobile radio networks nowadays cover extensive parts of the inhabited world. They are therefore particularly well suited to the worldwide tracking of products. However, mobile radio chips impose stringent requirements in respect of their energy consumption. This also applies to the recent generation of mobile radio chips that function according to the LTE standard (LTE=Long Term Evolution). Depending on the radio protocol chosen, peak currents of up to 400 mA have to be available, at least for short time windows.

Conventional printed batteries, as described in US 2010/081049 A1, for example, often do not satisfy the requirements outlined above and cannot supply the high peak currents demanded since they have an excessively high impedance.

It could therefore be helpful to provide an improved electrochemical energy storage cell or an improved battery suitable primarily for such applications in which high peak currents have to be provided for a short period and, at the same time, the energy storage cell or the battery can be thin and flexible such that it is usable for diverse possibilities of use and, furthermore, the energy storage cell or the battery can be producible in a cost-effective way such that it is particularly suitable for disposable articles.

SUMMARY

I provide an electrochemical energy storage cell having a layered construction including a first electrically insulating substrate and a first electrical conductor layer extending on an area of the first electrically insulating substrate, a second electrically insulating substrate and a second electrical conductor layer extending on an area of the second electrically insulating substrate, a first electrode layer composed of a positive electrode material, a second electrode layer composed of a negative electrode material, a first separator layer, a stacked arrangement of the layers in order: the first electrically insulating substrate—the first electrical conductor layer—the first electrode layer—the first separator layer—the second electrode layer—the second electrical conductor layer—the second electrically insulating substrate, a first electrolyte enabling an ion flow between the electrode layers, at least one electrode region with the stacked arrangement of the electrode layers and at least one supercapacitor region, a second separator layer, a second electrolyte enabling an ion flow between the supercapacitor layers, wherein, in the supercapacitor region a section of the first electrical conductor layer is covered with a first supercapacitor layer composed of a supercapacitor material and a section of the second electrical conductor layer is covered with a second supercapacitor layer composed of a supercapacitor material, and in the supercapacitor region the supercapacitor layers lie one above another in a stacked arrangement in order: the first electrically insulating substrate—the first electrical conductor layer—the first supercapacitor layer—the second separator layer—the second supercapacitor layer—the second electrical conductor layer—the second electrically insulating substrate.

I also provide a battery including at least two electrochemical energy storage cells, of which at least one electrochemical energy storage cell is configured according to the electrochemical energy storage cell having a layered construction including a first electrically insulating substrate and a first electrical conductor layer extending on an area of the first electrically insulating substrate, a second electrically insulating substrate and a second electrical conductor layer extending on an area of the second electrically insulating substrate, a first electrode layer composed of a positive electrode material, a second electrode layer composed of a negative electrode material, a first separator layer, a stacked arrangement of the layers in order: the first electrically insulating substrate—the first electrical conductor layer—the first electrode layer—the first separator layer—the second electrode layer—the second electrical conductor layer—the second electrically insulating substrate, a first electrolyte enabling an ion flow between the electrode layers, at least one electrode region with the stacked arrangement of the electrode layers and at least one supercapacitor region, a second separator layer, a second electrolyte enabling an ion flow between the supercapacitor layers, wherein, in the supercapacitor region a section of the first electrical conductor layer is covered with a first supercapacitor layer composed of a supercapacitor material and a section of the second electrical conductor layer is covered with a second supercapacitor layer composed of a supercapacitor material, and in the supercapacitor region the supercapacitor layers lie one above another in a stacked arrangement in order: the first electrically insulating substrate—the first electrical conductor layer—the first supercapacitor layer—the second separator layer—the second supercapacitor layer—the second electrical conductor layer—the second electrically insulating substrate.

I further provide a battery including at least two electrochemical energy storage cells, of which at least one electrochemical energy storage cell is configured according to the electrochemical energy storage cell having a layered construction including a first electrically insulating substrate and a first electrical conductor layer extending on an area of the first electrically insulating substrate, a second electrically insulating substrate and a second electrical conductor layer extending on an area of the second electrically insulating substrate, a first electrode layer composed of a positive electrode material, a second electrode layer composed of a negative electrode material, a first separator layer, a stacked arrangement of the layers in order: the first electrically insulating substrate—the first electrical conductor layer—the first electrode layer—the first separator layer—the second electrode layer—the second electrical conductor layer—the second electrically insulating substrate, a first electrolyte enabling an ion flow between the electrode layers, at least one electrode region with the stacked arrangement of the electrode layers and at least one supercapacitor region, a second separator layer, a second electrolyte enabling an ion flow between the supercapacitor layers, wherein, in the supercapacitor region a section of the first electrical conductor layer is covered with a first supercapacitor layer composed of a supercapacitor material and a section of the second electrical conductor layer is covered with a second supercapacitor layer composed of a supercapacitor material, and in the supercapacitor region the supercapacitor layers lie one above another in a stacked arrangement in order: the first electrically insulating substrate—the first electrical conductor layer—the first supercapacitor layer—the second separator layer—the second supercapacitor layer—the second electrical conductor layer—the second electrically insulating substrate, that provides high-current pulses having a current intensity of 100-400 mA, for a time duration of 50-250 ms.

BRIEF DESCRIPTION OF THE DRAWINGS

FIGS. 2(A)-2(B) show a preferred example of a battery having four series-connected individual cells, each with electrode region and supercapacitor region in views from below (A) and above (B).

DETAILED DESCRIPTION

Figure 1:
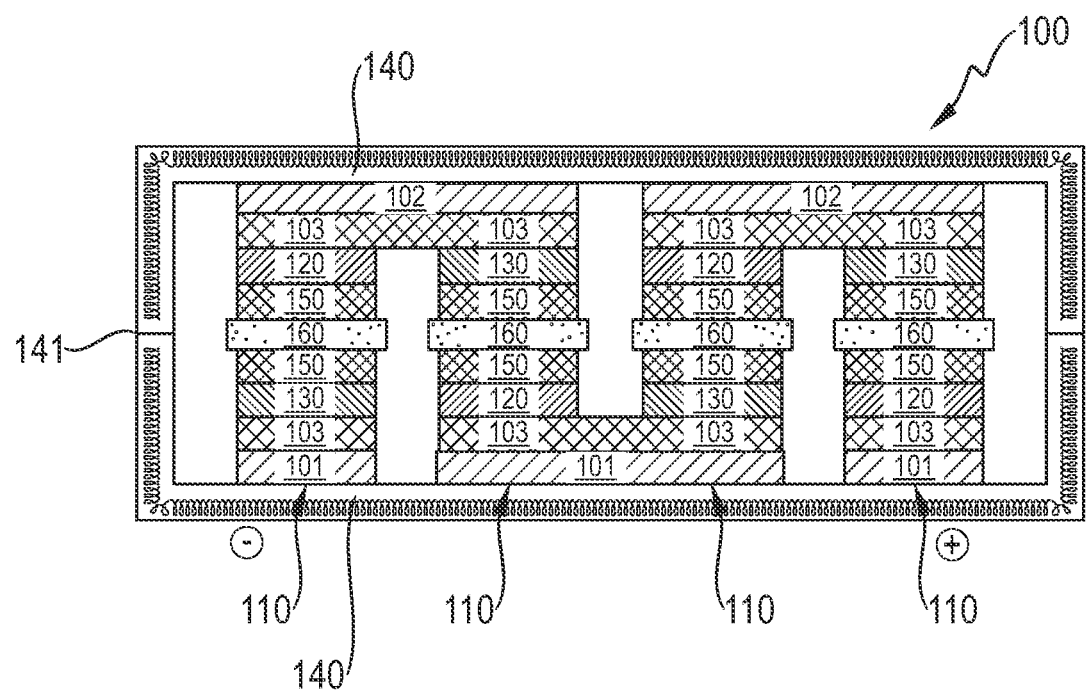
FIG. 1 shows a cross section through a battery having four series-connected individual cells having stacked electrode layers (layer stack).

The electrochemical energy storage cell has a layered construction. It is distinguished by features a. to g.:

a. a first electrically insulating substrate and a first electrical conductor layer extending on an area of the first electrically insulating substrate, and
b. a second electrically insulating substrate and a second electrical conductor layer extending on an area of the second electrically insulating substrate, and
c. a first electrode layer composed of a positive electrode material, and
d. a second electrode layer composed of a negative electrode material, and
e. a first separator layer, and
f. a stacked arrangement of the aforementioned layers with the following sequence: first electrically insulating substrate—first electrical conductor layer—first electrode layer—first separator layer—second electrode layer—second electrical conductor layer—second electrically insulating substrate, and g. a first electrolyte enabling an ion flow between the electrode layers.

Furthermore, the energy storage cell is characterized by features h. to l.:

h. at least one electrode region with the stacked arrangement of the electrode layers and at least one supercapacitor region, i. in the supercapacitor region a section of the first electrical conductor layer is covered with a first supercapacitor layer composed of a supercapacitor material and a section of the second electrical conductor layer is covered with a second supercapacitor layer composed of a supercapacitor material, and j. a second separator layer, and k. in the supercapacitor region the supercapacitor layers lie one above another in a stacked arrangement with the following sequence: first electrically insulating substrate—first electrical conductor layer—first supercapacitor layer—second separator layer—second supercapacitor layer—second electrical conductor layer—second electrically insulating substrate, and l. a second electrolyte enabling an ion flow between the supercapacitor layers.

The electrochemical energy storage cell is thus a cell having a stacked arrangement of the electrodes, wherein besides the actual electrode region of the cell constituting the Faraday region of the cell, in which energy is stored primarily chemically, an additional supercapacitor region is provided in the cell, in which electrical energy is stored primarily statically. A high current loading capacity of the cells is achieved by way of the supercapacitor region so that current peaks such as are required for LTE, for example, can readily be provided. In this example, these current peaks provided may be approximately twenty times as high as the current provided by the Faraday cell portion. In the pauses between the required current peaks, the supercapacitor regions are charged again by the Faraday cell portions so that when a current peak is next required, this current peak can be retrieved again.

Conventional energy storage cells formed exclusively by the electrode regions with a positive electrode and a negative electrode have only a Faraday capacitance. Although such energy storage cells can store large quantities of charge, access to these charges is impeded, and a fast discharge is not possible. The pulse loading capacity of such energy storage cells or of batteries constructed therefrom is thus very limited.

I address this problem by additionally providing at least one supercapacitor region in the energy storage cell. The supercapacitor region is expediently in a coplanar arrangement in relation to the electrode region(s) of the cell. As in the electrodes of the cell, the supercapacitor layers also lie one above another in a stack and are separated from one another by a separator and wetted with an electrolyte.

When a pulsed current loading occurs, the current flows via the supercapacitor region since the latter has a significantly lower internal resistance. In the loading pause that follows, the supercapacitor region is charged again from the Faraday portions or from the electrode regions. If longer charge withdrawals are provided, they can generally be effected completely via the electrode regions.

A pulsed current or current pulse preferably means a high current pulse of an order of magnitude of 100 to 400 mA, in particular 200 to 300 mA, for a time duration of 50 to 250 ms, in particular 100 to 200 ms.

At this juncture that although the first and second electrolytes can in principle differ from one another and/or be present separately from one another, it is preferable that the first electrolyte is identical with the second electrolyte. Preferably, the electrode region and the supercapacitor region thus have the same electrolyte.

The first electrode layer in the electrode region and the first supercapacitor layer preferably lie next to one another on the same, namely the first, electrical conductor layer. The first electrode layer and the first supercapacitor layer accordingly also have the same polarity, i.e., are both carriers of either positive or negative charge. The same analogously applies to the second electrode layer in the electrode region and the second supercapacitor layer, which are preferably likewise arranged next to one another on the same, namely the second, electrical conductor layer.

The first and second separator layers are preferably two separators present separately from one another. These can consist of the same material and also have the same thickness. However, it is indeed also possible to use different separator materials. In principle, it is also possible for the first and second separator layers to be parts or partial regions of one and the same separator. This is preferred only in few instances, however.

Supercapacitor materials per se are known. Supercapacitors are in principle electrochemical capacitors which, compared to conventional Faraday energy storage cells or batteries of comparable weight, have, for example, only approximately 10% of the energy density thereof. However, the power density of supercapacitors can be ten to one hundred times greater such that supercapacitors can be charged and discharged very much faster. Previous fields of use for supercapacitors range from providing extremely small currents for data retention in electronic devices through to the field of power electronics.

I exploit this property of supercapacitor materials and thus provide an energy storage cell that satisfies in particular the requirements in respect of providing high current pulses for a short period.

The portions of the supercapacitor regions and of the Faraday cell portions, that is to say of the electrode regions, can be set such that the current pulse demanded for the respective application is attainable. In this example, the cell can be designed such that the complete current demand in the required pulses is provided by way of the supercapacitor regions. The remaining portions of the cell constitute as it were a recharging station for the supercapacitor regions. The supercapacitor regions may also be referred to as buffer capacitors that provide a buffer between the consumer and the Faraday portions of the cell.

Preferably, the first supercapacitor layer and the second supercapacitor layer consist of the same supercapacitor material.

Preferably, the supercapacitor regions are distinguished by a high double layer capacitance.

Particularly preferably, the supercapacitor material or the supercapacitor layers are distinguished by at least one of:

a. the supercapacitor material comprises activated carbon having a large specific surface area, in particular having a specific surface area of 1000 to 3000 $m^2$ per gram of activated carbon, b. the supercapacitor material preferably comprises a conductive material, in particular graphite and/or carbon black, c. the supercapacitor material comprises a binder material, and d. the supercapacitor layers are applied to the conductor layers by a printing paste, the printing paste comprising a solvent.

It is preferred for a. to c. and particularly preferably a. to d. to be realized in combination.

An essential constituent of the supercapacitor material is preferably activated carbon. As an alternative or in addition to activated carbon, the supercapacitor material can also contain other manifestations of carbon, for example, activated carbon fiber, carbide-derived carbon, carbon aerogel, graphite, graphene or carbon nanotubes. However, conventional activated carbon has the advantage over those that it is particularly inexpensive and moreover non-toxic, chemically inert and corrosion-resistant.

Graphite and/or carbon black or substances having a similar effect can be used as conductive material in the supercapacitor material.

The use of a binder material or of a binder system is particularly advantageous since the supercapacitor material is applied in layer form to the electrical conductor layers and can adhere on the conductor layer particularly well by a binder system or a binder material. Furthermore, it ensures the structural integrity of the supercapacitor layers. Examples of appropriate binder systems are mixtures of long-chain polymers, e.g., polyvinylpyrrolidone (PVP), carboxymethylcellulose (CMC) or polyacrylate. To increase the elasticity, SBR is often added.

Particularly advantageously, the supercapacitor layers are printed onto the conductor layers. A printing paste comprising the supercapacitor material is expediently used for this purpose, the printing paste preferably comprising a solvent that evaporates in the course of the drying of the supercapacitor layers. Furthermore, the printing paste typically contains >90% activated carbon, <5% graphite and/or carbon black and between 2% and 8% binder.

The first and second substrates can be two substrates separated from one another. In many configurations, however, it is preferred for the first and second substrates to be different parts or partial regions of one and the same substrate, for example, two parts of a plastic or plastic-metal composite film folded along a crease line.

The following is preferred:
a. the electrode region and the supercapacitor region of the cell, including the electrode, separator and supercapacitor layers, are enclosed by a housing, and
b. the housing comprises the first and second substrates, and is preferably even formed from the first substrate and the second substrate.

The housing preferably comprises a housing inner side comprising the areas on which the first electrical conductor layer and the second electrical conductor layer are applied. Particularly preferably, the first and second electrically insulating substrates are films or parts or partial regions of a film.

It is particularly advantageous if the surface of the first and second substrates does not have electrically conductive properties, with the result that short circuits or creepage currents can be precluded if the conductor structures of the cell are printed directly onto the substrates. By way of example, the substrates can consist of plastic. By way of example, a film composed of a polyolefin or composed of polyethylene terephthalate is suitable.

Particularly preferably, the supercapacitor region of the energy storage cell is arranged in a terminal section of the cell, at least one electrical terminal contact for tapping off the electrical energy by a consumer being provided in the terminal section of the cell.

Particularly preferably, the energy storage cell is distinguished by at least one of:
a. the first and/or the second electrical conductor layer comprise(s) a region provided for tapping off electrical energy of the energy storage cell by an electrical consumer,
b. the region for tapping off electrical energy of the energy storage cell lies outside the housing, and
c. the supercapacitor region contacts the first and/or the second electrical conductor layer between the region provided for tapping off electrical energy and the electrode region.

Here, too, a. to c. directly above are preferably realized in combination with one another.

Regions provided for tapping off electrical energy of the energy storage cell by a consumer are, of course, free of electrode material and supercapacitor material. These regions form the terminal contacts of the cell.

If a plurality of cells are interconnected to form a battery, as is also described below, then provision is generally made for only one of the cells to provide the positive terminal contact and for only one of the cells to provide the negative terminal contact of the battery, the other cells being correspondingly interconnected with one another.

The arrangement of the supercapacitor region(s) of the energy storage cell between the region provided for tapping off electrical energy and the electrode region has the particular advantage that an electrical consumer can tap off the required energy or the required current pulse directly in the region of the supercapacitor region. A particularly fast discharge is possible as a result.

It is particularly preferred for the battery, including the housing, to have a maximum thickness in the range of a few millimeters, particularly preferably 0.5 mm to 5 mm, more preferably 1 mm to 3 mm. Its other dimensions depend on the number of individual cells that are electrically interconnected and the dimensions thereof. A battery having four serially interconnected cells can have a length of 5 to 20 cm and a width of 4 to 18 cm, for example.

Furthermore, the energy storage cell is particularly preferably distinguished by:
a. the supercapacitor region extends on an area proportion of 10 to 50% of the electrical conductor layers, in particular 15 to 30%, preferably 18 to 21%.

The area proportion of the supercapacitor region or of the supercapacitor regions in relation to the Faraday portions of the cell, i.e., to the electrode regions, can be chosen freely, in principle. In this example, the energy storage cell or a corresponding battery can be adapted for different applications and requirements. In this example, it is advantageous for many applications if the supercapacitor region occupies less than 50% of the area of the electrical conductor layers such that enough area proportion is also available for the electrode regions. By way of example, an area proportion of approximately 20% for the supercapacitor region is advantageous for many applications such that, on the one hand, there is enough energy storage capacity on the basis of the Faraday portions of the cell and, on the other hand, at the same time momentarily high current pulses can be retrieved via the supercapacitor region(s).

Particularly preferably, the energy storage cell is a printed cell in which one or more functional components of the cell are produced by a printing method, for example, a screen printing method. Particularly preferably, the energy storage cell in this regard is distinguished by at least one of a. to c.:
a. at least one of the electrode layers is a printed layer,
b. at least one of the electrical conductor layers is a printed layer, and
c. at least one of the supercapacitor layers is a printed layer.

It is preferred for a. and b. and particularly preferably a. and b. and c. to be realized in combination.

The printed electrode layers can be electrode layers generally customary for printed batteries and printed in particular with a printable paste. Such methods are known.

Besides the electrode layers, the electrical conductor layers and the supercapacitor layers, optionally even further functional parts of the cell can also be produced by printing, for example, one of the separator layers. Alternatively, however, the separator layers can also be formed by a solid porous separator, for example, a non-woven or a film.

Preferably, the electrical conductor layers and also the electrode layers and the supercapacitor layers are formed by printing methods since the cell can be produced particularly practicably and cost-effectively in this way. In particular, such a production method is particularly suitable for mass production.

Particularly preferably, the energy storage cell is distinguished by at least one of the directly following additional features a. and b.:
a. the first electrode layer is a positive electrode layer and preferably comprises a metal oxide, in particular manganese oxide, and
b. the second electrode layer is a negative electrode layer and preferably comprises metallic zinc or a metallic zinc alloy.

Preferably, a. and b. are realized in combination.

Of course, it is also possible for the second electrode layer to be a negative electrode layer, and the first electrode layer a positive electrode layer.

Such an energy storage element, also referred to as a zinc-manganese dioxide cell, is particularly preferred since it is producible in a cost-effective manner and is particularly environmentally compatible. Furthermore, a zinc-manganese dioxide cell is a non-rechargeable cell that is totally sufficient for many applications, in particular also for disposable articles.

For production of such a zinc-manganese dioxide cell, for example, a printable zinc paste comprising zinc powder, a suitable binder and a suitable solvent can serve as anode material for the negative electrode layer. A printable paste comprising manganese dioxide ($MnO_2$) and also carbon black and/or graphite as conductive material and a suitable binder and a suitable solvent can be used, in particular, to produce the cathode or the positive electrode layer.

Appropriate current leads for the negative electrode layer include in particular silver, copper and/or graphite. The current lead of the positive electrode layer is preferably formed from silver, nickel and/or graphite. Particularly preferably, silver conductive pastes are used for producing both current lead layers.

In principle, other materials are also suitable for the production of the energy storage cell. In this regard, the cell can be, for example, a zinc-silver oxide cell. In a zinc-silver oxide cell, the negative electrode comprises particulate metallic zinc or a particulate metallic zinc alloy as active electrode material, while the positive electrode comprises particulate silver oxide as active electrode material.

The cell can be a lithium-ion cell, for example.

In a particularly preferred energy storage cell such as a zinc-manganese dioxide cell, the negative electrode of the cell or the negative electrode material of the second electrode layer contains the particulate metallic zinc or the particulate metallic zinc alloy preferably in a proportion of 40% by weight to 99% by weight, in particular 40% by weight to 80% by weight, in relation to the total weight of the solid constituents of the negative electrode.

The choice of an electrochemical system having a zinc-containing negative electrode primarily affords particular advantages for the demanded safety of the cells. Systems having zinc-based negative electrodes require an aqueous electrolyte and are therefore non-combustible. Furthermore, zinc is environmentally compatible and cost-effective. In this respect, cells having an aqueous electrolyte are particularly advantageous.

Both the positive and the negative electrode layer of a cell very generally comprises an elastic binder or binder mixture and/or a conductivity additive.

The proportion constituted of the elastic binder or binder mixture in the electrode layers is preferably at least 1% by weight and a maximum of 10% by weight.

The elastic binder or binder mixture is preferably at least one member of the group comprising cellulose and derivatives thereof, in particular carboxymethylcellulose (CMC), polyacrylates (PA), polyacrylic acid (PAA), polychlorotrifluoroethylene (PCTFE), polyhexafluoropropylene (PHFP), polyimides (PI), polytetrafluoroethylene (PTFE), polytrifluoroethylene (PTrFE), polyvinyl alcohol (PVA), polyvinylidene difluoride (PVDF), styrene-butadiene rubber (SBR) and mixtures of the aforementioned materials.

The electrodes preferably contain the conductivity additive in a proportion of 2.5% by weight to 35% by weight. The positive electrode layer generally contains a significantly higher proportion of a conductivity additive than the negative electrode. A high proportion of the metal oxide in the positive electrode increases the capacity of the cell. For the current loading capacity, however, the proportion of the at least one conductivity additive is of greater importance than the total proportion of the metal oxide.

In principle, all percentage indications concerning proportions by weight of components in the electrode layers relate to the total weight of the solid constituents of the respective electrode layer. The proportions by weight of the components respectively involved in this example add up to 100% by weight. Before they are determined, moisture contained in the electrodes may need to be removed.

An appropriate conductivity additive for the electrodes is in particular a carbon-based material, in particular from the group comprising activated carbon, activated carbon fibre, carbide-derived carbon, carbon aerogel, graphite, graphene and carbon nanotubes (CNTs). However, the conductivity additive can also be a metal powder.

Particularly preferably, both the positive and the negative electrode layer contain, as binder or binder mixture, a combination of a polysaccharide suitable as electrode binder, in particular a cellulose derivative, and SBR. By way of example, the positive and negative electrode layers can contain 0.5% by weight to 2.5% by weight carboxymethylcellulose and/or chitosan and 5% by weight to 10% by weight SBR.

Particularly preferably, the energy storage cell is characterized by at least one of a. and b.:
a. the first separator layer is a porous separator impregnated with the first electrolyte, in particular an aqueous electrolyte (separator-liquid electrolyte combination), and b. the second separator layer is a porous separator impregnated with the second electrolyte, in particular an aqueous electrolyte (separator-liquid electrolyte combination).

As already mentioned, the separator layers can be porous sheet materials, for example, porous films or non-wovens, which are arranged between the electrode layers and preferably impregnated with the respective electrolyte.

Particularly preferably, a non-woven or a microporous plastic film, e.g., having a thickness of 60 to 120 µm and a porosity (ratio of void volume to total volume) of 35-60%, is used as porous sheet material. The non-woven or the film can consist, for example, of a polyolefin, for example, polyethylene.

Instead of a separator-liquid electrolyte combination in accordance with the explanations above, however, the cell can also be provided with a solid electrolyte, as described, for example, in EP 2 960 967 B1.

If the cell is not a lithium-ion cell, it is preferred for the first and second electrolytes to be an aqueous electrolyte.

It is possible to use, for example, alkaline electrolytes, for example, sodium hydroxide solution or potassium hydroxide solution. Aqueous electrolytes having a pH in the neutral range have the advantage, however, of being less dangerous in mechanical damage to the cell.

Particularly preferably, the cell is distinguished by at least one of features a. and b.:
a. an aqueous electrolyte containing a chloride-based conductive salt; and
b. the separators arranged between the electrode layers and the supercapacitor layers are impregnated with the electrolyte.

Particularly preferably, a. and b. are realized in combination with one another.

In particular, zinc chloride and ammonium chloride are suitable as a chloride-based conductive salt. It is preferred for the pH of the aqueous electrolyte to vary in the neutral or slightly acidic range.

Further preferably, the electrolytes can also be a gel electrolyte. Particular preference is given, for example, to an electrolyte hydrogel established on the basis of non-ionic crosslinked polymers, e.g., polyethylene glycol and/or diacrylate polyethylene glycol, and cationic polymers, e.g., cellulose.

The electrical conductor layers of the cell are, in particular, metallic structures to provide the electrical conductivity. Particularly preferably, the conductor layers comprise silver or a silver alloy. In principle, other metallic materials are also suitable; however, silver or a silver alloy is particularly preferred in particular for the example of a zinc-manganese dioxide cell.

In this example, the electrical conductor layers are formed in particular by metal particles, in particular silver particles or particles composed of a silver alloy. As already mentioned, such conductor layers can be produced particularly advantageously by printing methods. Printable conductive pastes comprising silver particles for producing conductor layers are known and freely available commercially.

The conductor layers of the electrochemical energy storage cell are furthermore preferably distinguished by at least one of a. and/or b.:
a. the first electrical conductor layer and/or the second electrical conductor layer have/has a layer thickness of 10 to 100 µm, and/or
b. the first electrical conductor layer and/or the second electrical conductor layer have/has a substantially uniform layer thickness.

Preferably, a. and b. are realized in combination with one another.

To protect the electrical conductor layers, particularly preferably, a. is provided:
a. the first electrical conductor layer and/or the second electrical conductor layer are/is at least regionally coated with a carbon layer.

The carbon layer is an electrically conductive layer of carbon arranged in particular between the respective electrical conductor layer, which is generally a metallic layer, and the respective electrode layer. Furthermore, a carbon layer is preferably also or optionally only provided between the electrical conductor layers and the supercapacitor layers.

In this example, the carbon layer protects the metallic conductor layer since it impedes or even prevents direct contact between the metallic layer and a liquid electrolyte of the cell. Particularly if the electrical conductor layer comprises silver particles, there is the risk of silver dissolving in the electrolyte and the electrical conductor layer being weakened or even destroyed. The carbon layer can therefore protect the electrical conductor layer composed of silver against direct contact with the electrolyte in a particularly advantageous manner.

The carbon layer can have, for example, a thickness of 5 µm to 30 µm; 10 µm to 20 µm being particularly preferred.

It can furthermore be preferred for the carbon layer to be subjected to a heat treatment after application, whereby the leak-tightness of the carbon layer can be improved.

In conventional energy storage cells, the electrical conductor layers or the current collectors are generally arranged in a planar fashion to be able to contact the electrode layers over the whole area. This can also be provided in my energy storage cells.

Particularly preferably, however, the cell is distinguished, with regard to the electrical conductor layers, by at least one of a and b:
a. the first electrical conductor layer is not formed over the whole area and preferably covers a proportion of 10 to 80%, preferably of 10 to 60%, of that area of the electrically insulating substrate on which the first electrical conductor layer extends, and
b. the second electrical conductor layer is not formed over the whole area and preferably covers a proportion of 10 to 80%, preferably of 10 to 60%, of that area of the electrically insulating substrate on which the second electrical conductor layer extends.

a. and b. are preferably realized in combination with one another.

The particular advantage when the conductor layers are not formed over the whole area resides in a possible material saving, which offers a considerable potential for reducing costs for the cells particularly when silver is used for the conductor layers.

Particularly preferably, the cell is distinguished, with regard to the conductor layers, by at least one of a. and b.:
a. the first electrical conductor layer comprises a plurality of conductor tracks in contact with one another, and
b. the second electrical conductor layer comprises a plurality of conductor tracks in contact with one another.

a. and b. are preferably realized in combination with one another.

Via the plurality of conductor tracks in contact with one another, the electron currents of the cell can nevertheless be effectively conducted away despite the conductor layer not being over the whole area, with the result that a sufficiently good performance of the cell is thereby ensured with utilization of the saving potential.

In a first particularly suitable configuration possibility for the conductor layers that are not over the whole area, the electrical conductor layers are distinguished by at least one of a. to c.:
a. the first electrical conductor layer comprises a central conductor track and also a plurality of conductor fingers on preferably one side of the central conductor track, the conductor fingers being linked to the central conductor track at preferably regular distances,
b. the second electrical conductor layer comprises a central conductor track and also a plurality of conductor fingers on preferably one side of the central conductor track, the conductor fingers being linked to the central conductor track at preferably regular distances, and
c. the central conductor track of the first electrical conductor layer and the central conductor track of the second electrical conductor layer are arranged offset at an angle of 90° with respect to one another in the zinc-manganese dioxide cell.

It is preferred for a. and b., particularly preferably a. and b. and c., to be realized jointly with one another.

The conductor fingers are a form of the aforementioned conductor tracks which is distinguished by the fact that they are linked to the central conductor track of the respective electrical conductor layer or as it were branch off therefrom.

By virtue of the offset arrangement of the structures of the conductor layers in the stacked arrangement of the electrodes and the supercapacitor layers in accordance with c., it is particularly advantageously possible, in particular when a plurality of such cells are interconnected to form a battery, to attain a particularly suitable and favourable construction and a suitable interconnection of the individual cells via the electrical conductor layers. In a corresponding battery, provision is preferably made for the conductor structures to be offset at an angle of 90° with respect to one another only in a portion of the cells forming the battery, for example, in the two outer cells in a battery having four cells.

In particularly preferred configurations of the electrical conductor layers, the conductor tracks and/or conductor fingers are distinguished by at least one of a. to d.:
a. the central conductor track of the first electrical conductor layer and/or of the second electrical conductor layer has a substantially uniform width,
b. the conductor fingers extend parallel to one another,
c. the conductor fingers have a substantially uniform width, and
d. the conductor fingers have an increasing width in the direction of the central conductor track.

In this example, c. and d. are alternatives. Preferably, a. and b. or a. and b. and c. are realized jointly with one another. In another preferred example, a. and d. are realized jointly with one another.

Depending on the size and applications of the cell, the conductor layers and in particular the shape and the number of the conductor fingers can be varied and adapted.

In the preferred configuration in accordance with a. and b. and preferably a. and b. and c., the electrical conductor layer has the shape of a comb, for example, the "teeth" of the comb projecting into the area of the conductor structure and the "spine" of the comb as central conductor track collecting and conducting away the ion current of the electrode layer (comb structure). The same correspondingly applies to the contacting of the supercapacitor layers via such conductor structures that are not over the whole area.

In the preferred configuration in accordance with a. and d., the conductor layer can be in the form of prongs connected to one another at the base, the wider base of the prongs being provided with a connection in the form of the central conductor track that collects and conducts away the electron current. The prongs or tines of this structure project into the area of the conductor layer and/or of the supercapacitor layer and collect the ion current in the area of the electrode layer and/or of the supercapacitor layer. For this example, the conductor fingers become linearly narrower (prong structure) with distance from the contact plane, i.e., from the central conductor track.

The example of the electrical conductor layers as a prong structure has the particular advantage that the conductor tracks of the conductor layer have the largest width in the vicinity of the central conductor track, where most of the current flows. The structure becomes narrower and narrower towards the regions further away. Since the conductor tracks are relatively wide or distributed in a planar fashion in the region of the highest current flow, bottlenecks for the current flow do not occur. Given a substantially constant thickness of the layer, the cross section of the conductor fingers increases in the direction of the central conductor track. This adaptation to the local current density thus ensures a particularly advantageous example.

The configuration of the electrical conductor layer as a comb structure has the particular advantage that a particularly large material saving can be realized by this means.

Particularly preferably, in the prong structure, the covering of the electrode layer and/or of the supercapacitor layer by the conductor structure can be 50% to 60%. In the comb structure, the covering of the electrode layer and/or of the supercapacitor layer by the conductor structure can preferably be 10% to 40%, particularly preferably 20% to 30%.

In a second particularly suitable configuration possibility for the conductor layers that are not over the whole area, the electrical conductor layers are distinguished by at least one of a. to e.:
a. the first electrical conductor layer comprises a plurality of conductor tracks crossing one another,
b. the second electrical conductor layer comprises a plurality of conductor tracks crossing one another,
c. the conductor tracks crossing one another comprise a plurality of conductor tracks in a parallel alignment,
d. the conductor tracks crossing one another enclose quadrilateral free regions, and
e. the conductor tracks crossing one another form a grid structure.

Preferably, a. and b. are realized jointly with one another. Particularly preferably, a. to e. are realized jointly with one another.

In this configuration, the first and/or second electrical conductor layer form(s) a grid structure, in particular a regular grid structure, via which the electrode layers and/or the supercapacitor layers are uniformly linked. In this example, free areas are present between the conductor tracks crossing one another, and allow a material saving that makes possible a particular cost saving in particular when a silver paste is used. The uniform covering of the electrode layers and/or of the supercapacitor layers with the grid structure effects good and uniform electrical linking, without excessively high losses in the performance of the cell occurring.

In the structure having conductor tracks crossing one another, various examples of the resulting grid structure can be realized, in particular, rectangular free areas. In this example, square free areas or rhombic free areas are possible. Other structures are also possible.

The degree of coverage in the grid structures can be 10% to 40%, for example.

Overall, the first and/or second electrical conductor layer in these examples can be described such that they form a structure which is not over the whole area and which is characterized in particular by a multiplicity of perforations or free areas. In the grid structure mentioned, the perforations can comprise, for example, a contour without corners, in particular circular or oval cutouts, or a contour having three or more corners, in particular four corners or else five corners or more. These perforations are preferably arranged substantially uniformly over the region with the perforations in a regular grid structure.

Particularly preferably, two different structures in the electrical conductor layers of a cell can be combined with one another. That is to say that in particular the first electrical conductor layer has a different structure from the second electrical conductor layer of the cell. The background of this preferred configuration of the cell may primarily be that the negative electrode of the cell generally has a better conductivity than the positive electrode, at least in the fresh state. For this reason, it may be sufficient if the conductor layer assigned to the negative electrode has a lower degree of coverage than the conductor layer assigned to the positive electrode, in order thus to achieve a maximum cost saving. In this regard, for example, the electrical conductor layer assigned to the negative electrode can have the comb structure explained above and the electrical conductor layer assigned to the positive electrode can have the prong structure explained above.

Other combinations are also possible, for example, the combination of a comb structure with a grid structure or the combination of a prong structure with a grid structure or the combination of different types of grid structures. Furthermore, it is possible for a conductor layer that is not over the whole area to be combined with a conventional, whole-area conductor layer. In general, it is advantageous here if the electrical conductor layer assigned to the positive electrode offers a greater coverage than the electrical conductor layer assigned to the negative electrode. However, the opposite situation may also prevail, depending on the application.

I furthermore provide a battery comprising at least two electrochemical energy storage cells, including at least one energy storage cell such as has been described above, the at least two energy storage cells being electrically interconnected with one another within the battery.

Preferably, the battery is distinguished by a.:
a. the supercapacitor regions of the electrochemical energy storage cells of the battery are situated in a terminal section of the battery, electrical terminal contacts for tapping off the electrical energy by a consumer being provided in the terminal section of the battery.

This configuration in accordance with a. has the particular advantage that the supercapacitor regions of the energy storage cells that are combined in the battery are all situated in a region of the battery which faces the electrical consumer. Given the requirement of a current pulse, in particular a high current pulse, the energy stored in the supercapacitor regions is therefore directly available and can be retrieved very rapidly. In this example, this high current region is situated as it were in the head of the battery such that the required current can reach the consumer by the shortest route. In the pauses between the required current peaks, the supercapacitor regions are as it were charged again from the back by the Faraday battery portions.

In particularly preferred configurations of the battery, the battery is distinguished by at least one of a.-c.:

a. the battery comprises at least two, preferably four, electrochemical energy storage cells,
b. the at least two, preferably four, electrochemical energy storage cells are interconnected serially with one another such that their voltages are added together, and
c. the individual energy storage cells are electrically interconnected among one another via common electrical conductor layers connecting electrodes of opposite polarities of adjacent energy storage cells.

It is preferred for a. and b. and particularly preferably a. to c. to be realized in combination with one another.

Such batteries can be manufactured with a very thin and flexible construction, as a result of which such batteries can be used for diverse applications, in particular also for the energy supply of everyday articles or disposable articles. By way of example, a battery can have a layer thickness of 2 mm or less.

It is particularly preferred that in the series of the at least two, preferably four, energy storage cells interconnected serially with one another, the first and last energy storage cells in the series are present and the first energy storage cell in the series comprises a first or second electrical conductor layer having a region provided for tapping off electrical energy of the energy storage cell by an electrical consumer, and the second energy storage cell in the series comprises a first or second electrical conductor layer having a region provided for tapping off electrical energy of the energy storage cell by an electrical consumer. It is furthermore preferred for the battery to comprise a housing enclosing the cells, and for the regions for tapping off electrical energy to lie outside the housing. Furthermore, it is preferred for the first cell in the series to comprise a supercapacitor region that contacts its first or second electrical conductor layer between the region provided for tapping off electrical energy and its electrode region, and for the last cell in the series to comprise a supercapacitor region that contacts its first or second electrical conductor layer between the region provided for tapping off electrical energy and its electrode region.

It is particularly preferred for the cells and also the cells of the battery to be distinguished by at least one of a. to g.:

a. their electrode layers are in rectangular fashion or in the form of strips,
b. electrode layers of opposite polarities of the individual cells each occupy the same area on the substrates,
c. the electrode layers that are electrically connected to one another and also the electrode layers that are not electrically connected to one another are each aligned parallel to one another,
d. electrode layers of the same polarities of the individual cells have substantially identical dimensions,
e. the electrode layers have
a length of 1 cm to 25 cm, preferably 5 cm to 20 cm, and
a width of 0.5 to 10 cm, preferably 1 cm to 5 cm,
f. the electrical conductor structures have a thickness of 2 µm to 250 µm, preferably 2 µm to 100 µm, particularly preferably 2 µm to 25 µm, more preferably 5 µm to 10 µm, and
g. the electrode layers have a thickness of 10 µm to 350 µm.

a. to g. are preferably realized in combination with one another.

The positive and negative electrode layers each particularly preferably have a thickness of 10 µm to 250 µm. It may be preferred for the positive electrode layers to be arranged such that they are somewhat thicker than the negative electrode layers since the latter have a higher energy density in many instances. In this regard, in some applications, it may be preferred to form the negative electrode layers with a thickness of 30 µm to 150 µm and the positive electrode layers with a thickness of 180 to 350 µm. The capacitances of the positive and negative electrodes can be balanced by adjusting the thicknesses. In this regard, it is preferred for the positive electrode to be overdimensioned in relation to the negative electrode.

Particularly preferably, the battery is distinguished by at least one of a.-c.:
a. the battery is designed for a voltage of 6 volts,
b. the battery has a capacitance of 100 to 400 mF, in particular 250 to 350 mF, and
c. the battery has a specific capacitance of 10 to 100 mF/cm$^2$, in particular 60 to 70 mF/cm$^2$.

Such a preferred battery can be designed, for example, for current pulses with 220 mA for 130 ms. Depending on the application, however, these parameters can be adapted and the design of the battery can be adapted, in particular also with regard to the area proportion of the electrical conductor layers covered by the supercapacitor layers.

Such a battery is suitable in particular for applications in which high currents are required for a short period. Such a current pulse is generally followed by a phase with low currents, for example, basic currents of electronics such as in the sleep mode, for example. Such phases with low currents may follow, for example, for 10 to 30 minutes, for example, 15 minutes, after a requested high current pulse. The high current regions or the supercapacitor regions of the battery are recharged in this time between the required pulses such that the battery as such is conserved. Such a battery can be designed, for example, such that 500 signals or optionally 1000 to 1500 signals (high current pulses) can be provided. This functioning of the battery can be used in particular to transmit a radio signal over relatively large distances in an electronic system.

I furthermore provide the use of a battery in accordance with the above description for providing high current pulses of 100 to 400 mA, in particular 200 to 300 mA, for a time duration of 50 to 250 ms, in particular 100 to 200 ms. Such a preferred use of the battery resides in particular in the provision of current pulses for LTE. The time between the pulses can be, for example, 10 to 20 minutes, e.g., 15 minutes. The supercapacitor regions are recharged in this time.

Such a use of the battery is suitable in particular for a use in association with RFID tags. In this example, it is expediently provided that the battery can supply the energy required for this over a time period of a number of months, for example, wherein a corresponding number of signals based on the required high current pulses can be transmitted over this time period.

The application for the provision of pulses is not restricted to LTE. In a corresponding manner, the battery is also suitable for the provision of high current pulses for other data transmission standards, for example, according to the Wi-Fi standard (IEEE 802.11) or the Bluetooth standard (IEEE 802.15.1), or for other applications in which high current pulses are used.

Further features and advantages will become apparent from the following description of examples in association with the drawings. The individual features can each be realized by themselves or in combination with one another.

FIG. 1 shows a sectional illustration through the electrode region of a battery 100 having a stacked arrangement of the electrode layers 120, 130 of the individual electrochemical cells 110 of the battery 100. The supercapacitor region is not visible in this illustration and will be explained in greater detail on the basis of the explanations below concerning FIGS. 2 and 3.

The battery 100 illustrated in cross section in FIG. 1 comprises four individual cells 110 arranged as layer stacks. The left-hand layer stack of the cell 110 is formed, from bottom to top, by a first electrical conductor layer 101, a carbon layer 103 arranged thereon, a second electrode layer 130 comprising negative electrode material, an electrolyte layer 150, a separator layer 160, a further electrolyte layer 150, a first electrode layer 120 composed of positive electrode material, a further carbon layer 103 and a second electrical conductor layer 102. In this left-hand layer stack, the second electrode layer 130 comprising the negative electrode material is assigned to the first electrical conductor layer 101 and the first electrode layer 120 comprising the positive electrode material is assigned to the second electrical conductor layer 102. The polarities of the adjacent layer stack are opposite in each instance. The electrical conductor layers 101 and 102 are situated respectively on a first and second area of an electrically insulating film 140 forming the enclosure or the housing of the battery 100. Partial regions of the film here serve as first substrate and as second substrate.

During production of the battery 100, the respective layers of one half of the stack are first applied by printing methods, in particular, to the electrically insulating film 140 spread out in a planar fashion. Afterwards, the stacks of the individual cells 110 are joined together by the electrically insulating film 140 being folded up or turned up along the folding line 141. After being turned up, the electrically insulating film 140 can, for example, be welded or adhesively bonded and thus form a closed housing in which the layer stacks of the individual cells 110 are arranged.

The separator 160 is framed on both sides by the electrolyte layers 150. Since the electrolyte layers 150, by virtue of their proportion constituted by electrically non-conductive components, contribute to the positive electrode layer 120 and the negative electrode layer 130 being electrically insulated from one another, the electrolyte layers 150 can be regarded as constituents of the separator 160.

The first and second electrical conductor layers 101 and 102 of the respective layer stacks are arranged such that each of the electrical conductor layers respectively connects two adjacent layer stacks to one another. In this example, two conductor layers 102 are situated on the top side of the layer stacks and respectively connect the two left and two right layer stacks to one another. On the bottom side, the second electrical conductor layer 101 connects the two central layer stacks to one another. On the right and left thereof on the bottom side of the layer stacks, the respective second electrical conductor layers 101 or terminals connected thereto form the negative pole and the positive pole of the battery or the terminal contacts towards the outside. In the region of the terminal contacts, the electrical conductor structures 101 are not covered with electrode material. The voltage supplied by the battery 100 is able to be tapped off from outside via the terminal contacts.

The orientation of the layer stacks forming the individual cells 110 in adjacent layer stacks has opposite polarity. It is evident from this that the electrical conductor layers 101, 102 should be understood alternately either as first or respectively as second electrical conductor layer within the meaning of the explanations above. The negative pole of the battery 100 is therefore formed by one of the electrical conductor layers with the reference sign 101 on the left-hand side in this illustration. The positive pole of the battery is formed by one of the electrical conductor layers likewise with the reference sign 101 on the right-hand side in this illustration.

The individual cells 110 of the battery 100 are preferably zinc-manganese dioxide cells. Each of the cells is designed, for example, such that it supplies a rated voltage of approximately 1.5 V. Overall, therefore, a rated voltage of approximately 6 V can be provided by the battery 100 composed of four cells.

FIG. 2 shows a schematic view of a battery 100 with a common electrode region 200 and a common terminal supercapacitor region 300, which may also be referred to as high current region. The common electrode region 200 is composed of the electrode regions of the individual cells 110 and the common supercapacitor region 300 is composed of the supercapacitor regions of the individual cells 110. Hereinafter, for the sake of simplicity, the common electrode region 200 and the common supercapacitor region 300 are referred to as electrode region 200 and as supercapacitor region 300. In this example, the electrode region 200 is formed by four individual cells 110 interconnected serially with one another and each having a stacked arrangement of the electrodes, in accordance with the structure that was explained with reference to the cross section through the layer stacks as shown in FIG. 1. In this example, the illustration (A) shown on the left in FIG. 2 corresponds to a view of the battery in accordance with FIG. 1 from below, also referred to as front side. The illustration (B) on the right-hand side of FIG. 2 shows a view of the battery in accordance with FIG. 1 from above, also referred to as rear side.

The dashed line between FIGS. 2(A) and 2(B) indicates a folding line at which the two halves of the battery are folded up in mirror-inverted fashion in order thus to form the corresponding layer stacks.

Besides the subdivision of the battery 100 into the common electrode region 200 and the common supercapacitor region 300, FIG. 2 reveals the structure of the conductor layers, which in this example is a comb structure which is not over the whole area and which has central conductor tracks 111 (comb spine) and conductor fingers 112 (teeth) projecting therefrom. The conductor fingers 112 arranged as conductor fingers 112 and projecting from the central conductor track 111 at a right angle preferably run parallel and have a constant width. Via the conductor fingers 112, the electrode layers and the supercapacitor layers are contacted in the area.

On the front side of the battery (FIG. 2(A)), the two central cells 110 are interconnected with one another by a common conductor structure. On the rear side of the battery (FIG. 2(B)), the two left and two right cells 110 are interconnected with one another by a common conductor structure. For an electrical interconnection of the layer stacks of the two central cells 110, the central conductor track 111 runs as a common conductor track on the front side of the battery (see FIG. 2(A)). In the two lateral cells 110, the central conductor tracks 111 on the front side of the battery (see FIG. 2(A)) transition to the terminal contacts 180 forming the negative and positive poles of the battery. In the region of the terminal contacts 180, the electrical conductor structures are not covered with electrode material.

Furthermore, in the terminal region of the battery on which the terminal contacts 180 are situated, a further central conductor track running transversely is present on the rear side (FIG. 2(B)), and in the two central cells on the front side (FIG. 2(A)).

On the front side (FIG. 2(A)) of the battery 100, the alignment of the central conductor track 111 and of the conductor fingers 112 of the (viewed from the left) 1st and 2nd cells and also of the 3rd and 4th cells is offset at an angle of 90° with respect to one another. On the rear side of the battery (see FIG. 2(B)), all the conductor fingers 112 are aligned correspondingly like the conductor fingers 112 of the two central cells 110 on the front side. In this example, on the rear side (FIG. 2(B)), the two right and two left cells 110 are electrically interconnected with one another by a central conductor track 111. On both sides of the common central conductor track 111, the respective conductor fingers 112 project at a right angle. That is to say that the mutually opposite conductor structures (i.e., at the top and bottom in the respective layer stacks) of the two outer cells 110 are offset at a right angle with respect to one another, whereas the mutually opposite conductor structures of the two central cells 110 are not offset.

The regions of the battery each covered by a cell 110 within the battery each have a width of approximately 20 mm, for example, that is to say that the width of the battery is overall 80 mm (4×20 mm), for example. The longitudinal extent of the individual cells 110 can each be 100 to 110 mm, for example, wherein the supercapacitor region can extend over 40 mm, for example, in the terminal region of this length. In such an example, the width of the projecting conductor fingers 112 or of the teeth of the comb can be 2 mm with a distance of 8 mm between the individual conductor fingers 112. The coverage by these conductor structures can be, for example, 20% to 30% of the area of the underlying electrically insulating substrate.

The configuration of the conductor layers in this example as a comb structure should be understood to be merely by way of example. In a comparable manner, other perforated conductor structures such as, for example, prong structures or grid structures, or whole-area conductor layers can be used for the battery.

In the electrode region 200, the conductor layers or the conductor structures 111, 112 of the individual cells 110 are coated with negative electrode material 130 or respectively with positive electrode material 120. In the supercapacitor region 300, the conductor layers or the conductor structures 111, 112 are coated with supercapacitor material. Since the supercapacitor regions lie on the same conductor layers as the anode and the cathode, charge exchange between the electrode region 200 and the supercapacitor region 300 can take place.

Figure 3A:
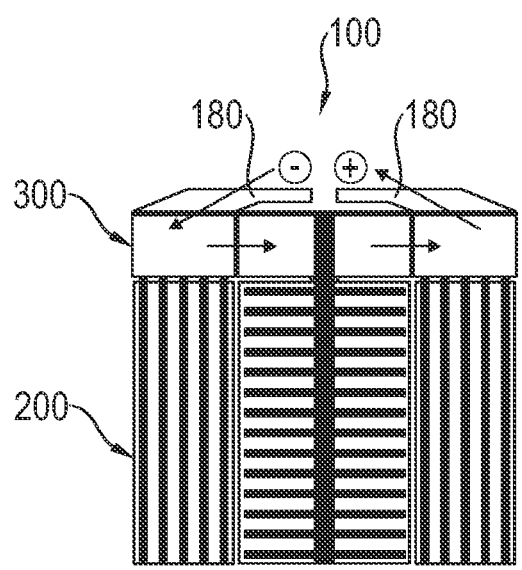
FIGS. 3(A)-3(B) show an illustration of the example of the battery from FIGS. 2(A)-2(B) in the view from below with an illustration of the current path during a pulse loading (A) and in a pause between pulse loadings (B).
Figure 3B:
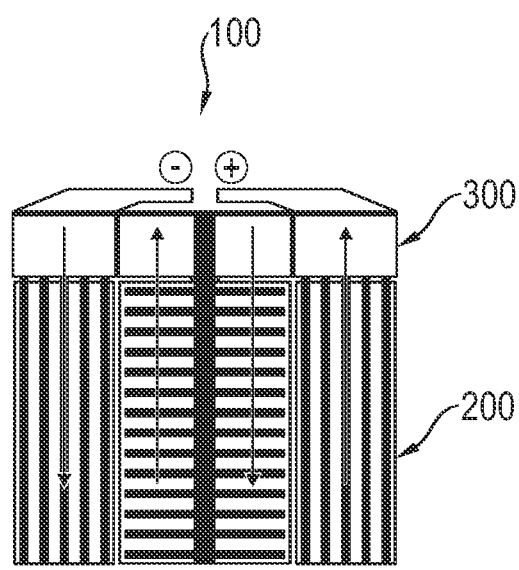

The supercapacitor regions 300 have a very low impedance in comparison with the electrode regions 200. It is evident from this that the supercapacitor regions 300 discharge very rapidly when a current pulse is required. FIG. 3 illustrates the current flow of a battery 100 during a pulse loading (FIG. 3(A)) and during the pause between the requirement of current pulses (FIG. 3(B)). Both subfigures each show a view of the front side of the battery 100 corresponding to the view from FIG. 2. If a current pulse is required via the terminal contacts 180 of the battery 100, the current passes substantially or exclusively via the supercapacitor regions 300, as is indicated by the arrows in FIG. 3(A). After the requirement of a current pulse or in the pauses between required current pulses, for example, in a sleep mode of the connected consumer, the supercapacitor region 300 is recharged from the electrode region 200, as is indicated by the arrows in FIG. 3(B).

During the pulse load, the current indicated by the arrows flows on the shortest path via the low-impedance supercapacitor region 300. The latter thus produces the charge for the pulse. This gives rise to a gradient in the electrochemical potential. In the pause (FIG. 3(B)) between individual pulses, the gradient is compensated for by compensation currents in or from the electrode region 200 into the supercapacitor region 300. Consequently, the required high currents are drawn from the supercapacitor region 300. The battery 100 itself is only loaded with a low uniform current and can deliver its full capacitance under these circumstances.

For a typical application, the required charge can be estimated as follows, for example:

The charge of the pulse is 29 mAs.

Given a maximum voltage dip of 100 mV, the required capacitance is 293 mF.

That corresponds to a supercapacitor area of 4.4 cm$^2$.

A typical battery has an electrode area (area to be occupied of the electrical conductor) of 24.2 cm$^2$, for example.

The supercapacitor area is 4.51 cm$^2$.

Accordingly, the supercapacitor region occupies an area of 19% of the electrode area.

These calculations are based on the requirements of an LTE pulse, with a current of 220 mA, a duration of 133 ms and a charge of 29.26 mAs being demanded. Given a voltage dip of dU max of 100 mV, this results in a required capacitance of 292.6 mF. The required area for this is 4.51 cm$^2$. Given an electrode area or an area to be occupied on the electrical conductor layers with a height of 110 mm, a width of 22 mm and a total area of 24.2 cm$^2$, this results in a required area proportion of 19% for the supercapacitor region.

Figure 4A:
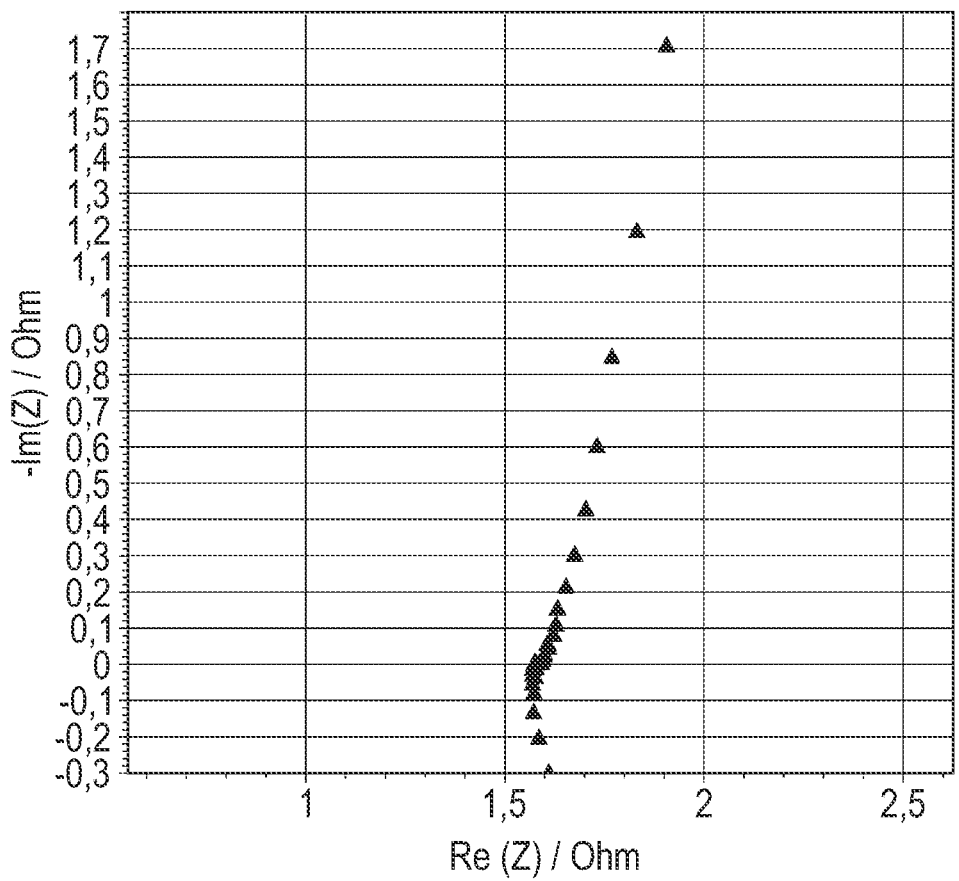
FIGS. 4(A)-4(B) show impedance spectra in a Nyquist plot of the supercapacitor region (A) in comparison with the electrode region (B) of my battery.
Figure 4B:
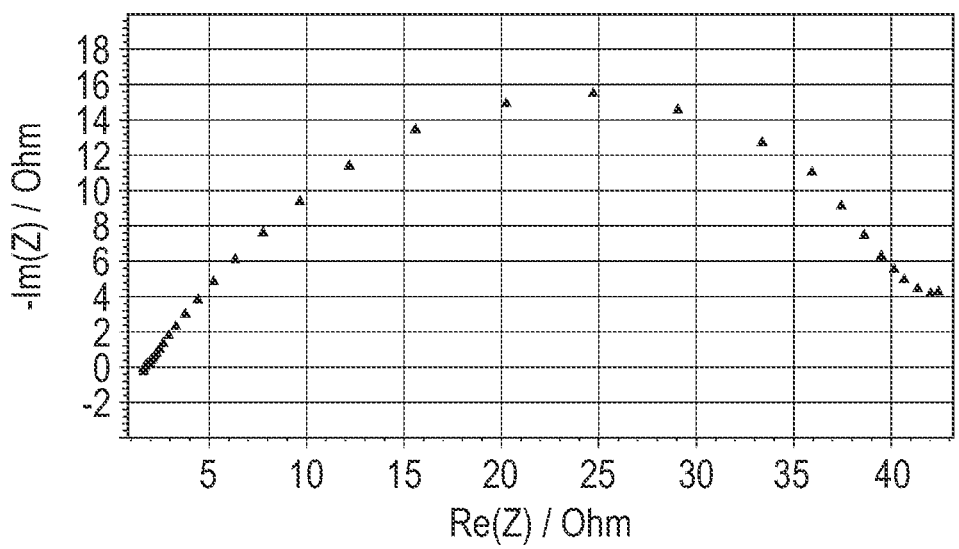

FIG. 4 illustrates capacitance measurements in the supercapacitor regions (FIG. 4(A)) in comparison with the electrode regions (FIG. 4(B)). The graphs show the electrochemical impedance spectra in a Nyquist plot ($-\mathrm{Im}(Z)$ versus $\mathrm{Re}(Z)$). A steeply rising straight line (FIG. 4(A)) arises in the supercapacitor regions, while the impedance spectra of the electrode regions show the semicircle typical thereof (FIG. 4(B)). The high current loading capacity of the supercapacitor regions is evident in the following cut-off values:

|  | Supercapacitor region | Electrode region |
| --- | --- | --- |
| 100 kHz | 1.7 Ω | 1.7 Ω |
| 0.1 Hz | 2.4 Ω | 43 Ω |

These measurement results give rise to a specific capacitance of the supercapacitor regions of 64 mF/cm$^2$.

These measurements are based on printed supercapacitor areas having a width of 38 mm and a length of 38 mm, i.e., overall an area of 14.44 cm$^2$. A typical separator for stacked zinc-manganese dioxide cells and a customary electrolyte (zinc chloride, binder, water) were used for the construction of the layer stack with the sequence supercapacitor area-separator-supercapacitor area.

The invention claimed is:

1. An electrochemical energy storage cell having a layered construction, comprising at least one electrode having
   a. a first electrically insulating substrate and a first electrical conductor layer extending on an area of the first electrically insulating substrate,
   b. a second electrically insulating substrate and a second electrical conductor layer extending on an area of the second electrically insulating substrate,
   c. a first electrode layer composed of a positive electrode material,
   d. a second electrode layer composed of a negative electrode material,
   e. a first separator layer,
   f. a stacked arrangement of the layers in order: the first electrically insulating substrate—the first electrical conductor layer—the first electrode layer—the first separator layer—the second electrode layer—the second electrical conductor layer—the second electrically insulating substrate,
   g. a first electrolyte enabling an ion flow between the electrode layers, and further comprising at least one supercapacitor region having
   h. a first supercapacitor layer of a supercapacitor material,
   i. a second supercapacitor layer of a supercapacitor material,
   j. a second separator layer,
   k. a second electrolyte enabling an ion flow between supercapacitor layers, wherein
   l. in the at least one supercapacitor region a section of the first electrical conductor layer is covered with the first supercapacitor layer and a section of the second electrical conductor layer is covered with the second supercapacitor layer, and
   m. in the at least one supercapacitor region the supercapacitor layers lie one above another in a stacked arrangement in order: the first electrically insulating substrate—the first electrical conductor layer—the first supercapacitor layer—the second separator layer—the second supercapacitor layer—the second electrical conductor layer—the second electrically insulating substrate.

2. The electrochemical energy storage cell according to claim 1, having at least one of:
   a. the supercapacitor material comprises activated carbon having a specific surface area of 1000 to 3000 m$^2$ per gram of activated carbon,
   b. the supercapacitor material comprises a conductive material, graphite and/or carbon black,
   c. the supercapacitor material comprises a binder material,
   d. the supercapacitor layers are applied to the electrical conductor layers by a printing paste, the printing paste comprising a solvent.

3. The electrochemical energy storage cell according to claim 1 having:
   a. the at least one electrode region and the at least one supercapacitor region including the electrode layers, separator layers, and the supercapacitor layers are enclosed by a housing, and
   b. the housing is formed from the first electrically insulating substrate and the second electrically insulating substrate.

4. The electrochemical energy storage cell according to claim 3, having at least one of:
   a. the first and/or the second electrical conductor layer comprise(s) a region provided for tapping off electrical energy of the energy storage cell by a consumer,
   b. the region for tapping off electrical energy of the energy storage cell lies outside the housing, and
   c. the at least one supercapacitor region contacts the first and/or the second electrical conductor layer between the region provided for tapping off electrical energy and the electrode region.

5. The electrochemical energy storage cell according to claim 1 having:

a. the at least one supercapacitor region extends on an area proportion of 10 to 50% of the electrical conductor layers.

6. The electrochemical energy storage cell according to claim 1 having at least one of:
   a. at least one of the electrode layers is a printed layer,
   b. at least one of the electrical conductor layers is a printed layer, and
   c. at least one of the supercapacitor layers is a printed layer.

7. The electrochemical energy storage cell according to claim 1 having at least one of:
   a. the first electrode layer comprises a metal oxide, and
   b. the second electrode layer comprises metallic zinc or a metallic zinc alloy.

8. The electrochemical energy storage cell according to claim 1 having at least one of:
   a. the first electrical conductor layer is not formed over the whole area and covers a proportion of 10 to 80% of that area of the first electrically insulating substrate on which the first electrical conductor layer extends, and
   b. the second electrical conductor layer is not formed over the whole area and covers a proportion of 10 to 80% of that area of the second electrically insulating substrate on which the second electrical conductor layer extends.

9. The electrochemical energy storage cell according to claim 1 having at least one of:
   each of the first electrical conductor layer and the second electrical conductor layer comprises a conductor structure having a plurality of conductor tracks crossing one another,
   wherein the plurality of conductor tracks are in a parallel alignment,
   the plurality of conductor tracks crossing one another enclose quadrilateral free regions, and
   the plurality of conductor tracks crossing one another form a grid structure.

10. A battery comprising at least two electrochemical energy storage cells, of which at least one electrochemical energy storage cell is configured according to claim 1.

11. A battery according to claim 10 that provides high-current pulses having a current intensity of 100-400 mA for a time duration of 50-250 ms.

* * * * *